J. R. LANCASTER.
Cooking Stove.
No. 13,971.
Patented Dec. 18, 1855.
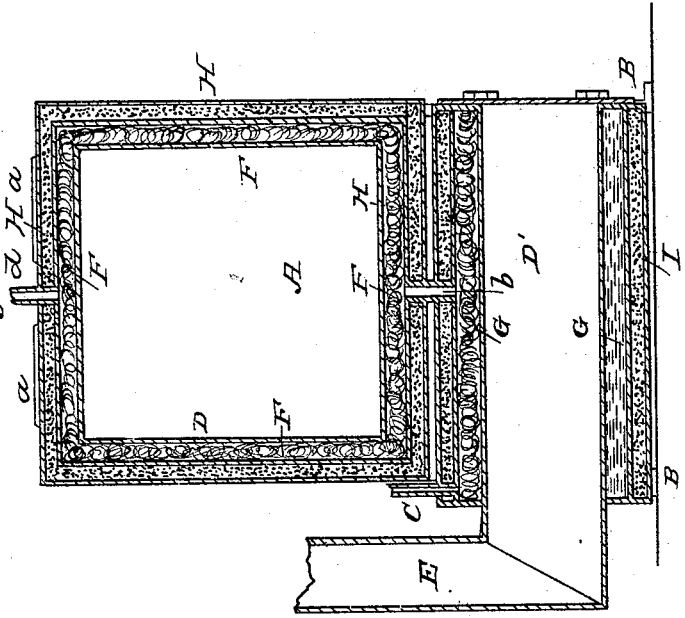
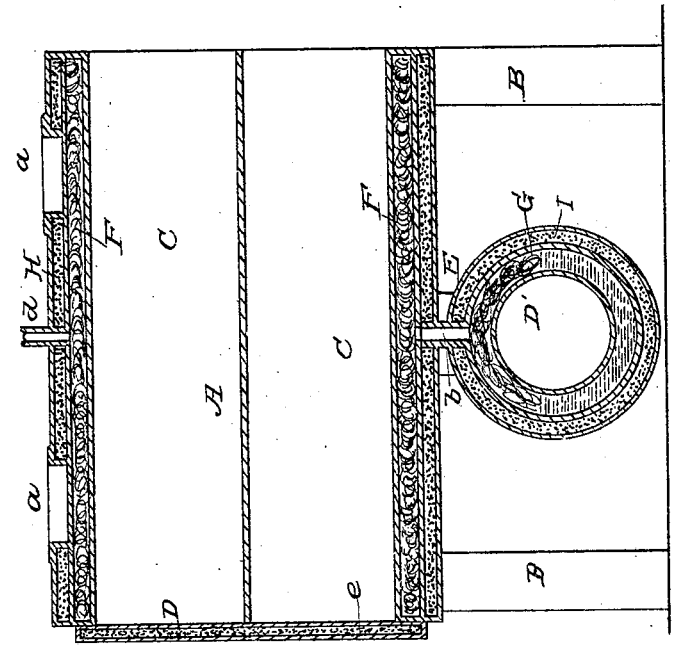

UNITED STATES PATENT OFFICE.

JOSEPH B. LANCASTER, OF TAMPA, FLORIDA, ADMINISTRATOR OF JOHN R. LANCASTER, DECEASED.

COOKING-STOVE.

Specification of Letters Patent No. 13,971, dated December 18, 1855.

*To all whom it may concern:*

Be it known that JOHN R. LANCASTER, now deceased, of Tampa, in the county of Hillsboro and State of Florida, did invent certain new and useful Improvements in Cooking-Stoves; and I, JOSEPH B. LANCASTER, the legal administrator of deceased, of Tampa, aforesaid, do hereby declare that to the best of my knowledge and belief the following is a full, clear, and exact description of the same, reference being had to the accompanying drawings, forming part of this specification, in which—

Figure 1, is a vertical longitudinal section of a cooking stove constructed after his invention. Fig. 2, is a vertical transverse section of the same.

Similar letters of reference indicate corresponding parts in the two figures.

The nature of my invention consists in the arrangement of parts as hereinafter described whereby a cheap, simple and compact stove is produced, combining the two important features of being non-conducting and steam cooking.

To enable others skilled in the art to make and use his invention, I will proceed to describe the construction and operation of the same.

A, represents a large elevated bake or other oven placed upon legs and having its interior chamber divided into two or more small chambers or ovens C, C, as shown in Fig. 1. This oven may have, provided in its top, recesses *a, a*, in order to receive kettles or other culinary vessels. It may also have doors D, at each end said doors being made hollow, as at *e*, and fitted and packed with charcoal, as shown.

D′, is the fire chamber; it may be cylindrical and placed under the center of the oven A as shown. E, is the draft flue of the same.

Around the entire outer surface of the oven A, a steam space F, is formed and around the fire chamber D′, a water space G, which communicates with F, by a pipe *b*. The space G, serves for containing the water which is to be converted into steam, by the action of the heat in the fire chamber, and the space F, is to allow of the free circulation of the steam around the sides, top and bottom of the oven, as illustrated, in order to perfectly carry on the cooking process. *c*, is an inlet passage to the water and *d*, an escape to the steam.

Surrounding the entire outer surface of the water and steam spaces G, F, is a space H, I, for receiving charcoal or some substance, as illustrated, which, when packed tightly in said space will prevent the radiation of the heat and thus render the stove non-conducting or capable of confining its heat in a manner to facilitate the cooking process and thus economize fuel and also to avoid annoyance from too great heat in the room.

This invention is very simple, cheap and convenient for use and meets the wants of thousands who suffer during the warm seasons in southern and even in northern latitudes from excessive heat while superintending the cooking process. It also is useful in all places where fuel is scarce likewise where economy of space is of importance, as, for instance, on shipboard, it effecting a great saving in the consumption of fuel and thus avoiding the necessity of carrying so large a quantity as when a hot air and radiating stove is used.

I am aware that the space around a portable bake oven, heated by hot air has been divided in a manner to form two chambers, the outer one of which served for non-conducting material and the inner one for the circulation of hot air. Also that steam has been employed for the purpose of cooking being generated by means of a cylindrical casing to the fire pot.

Therefore I only claim as the invention of the deceased and desire to secure by Letters Patent—

The arrangement of parts as herein described and shown for the purpose set forth.

JOS. B. LANCASTER,
*Administrator of John R. Lancaster, deceased.*

Witnesses:
W. H. McDONALD,
JESSE CARTER.